April 21, 1959   A. E. MOULTON   2,883,180
HYDRAULIC ACCUMULATORS
Filed Aug. 22, 1955   2 Sheets-Sheet 1
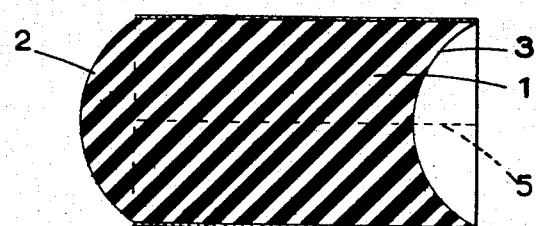
FIG. 1.
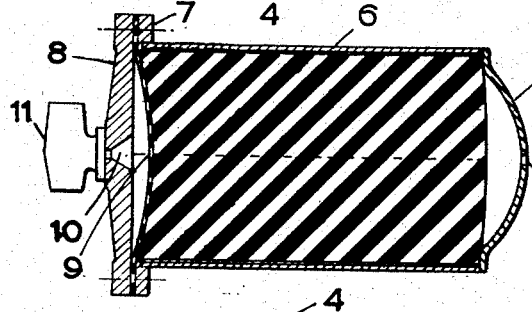
FIG. 2.
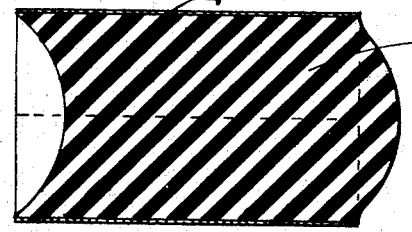
FIG. 3.
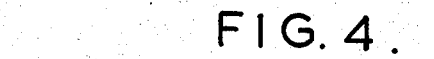
FIG. 4.
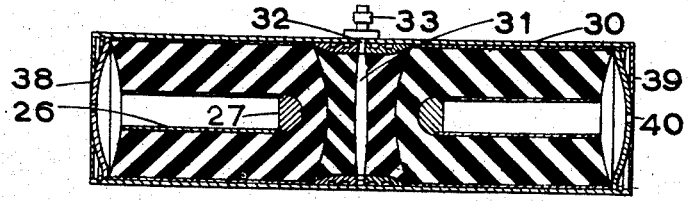
FIG. 5.
INVENTOR
Alexander Eric Moulton
BY Shoemaker & Mattare
ATTORNEYS April 21, 1959     A. E. MOULTON     2,883,180
HYDRAULIC ACCUMULATORS
Filed Aug. 22, 1955     2 Sheets-Sheet 2
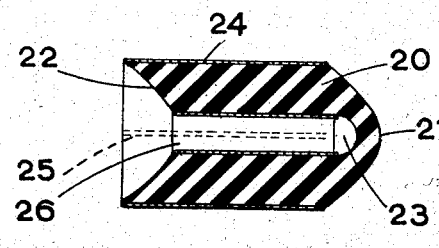
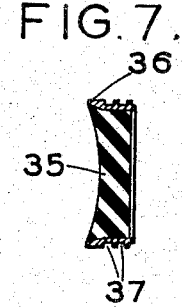
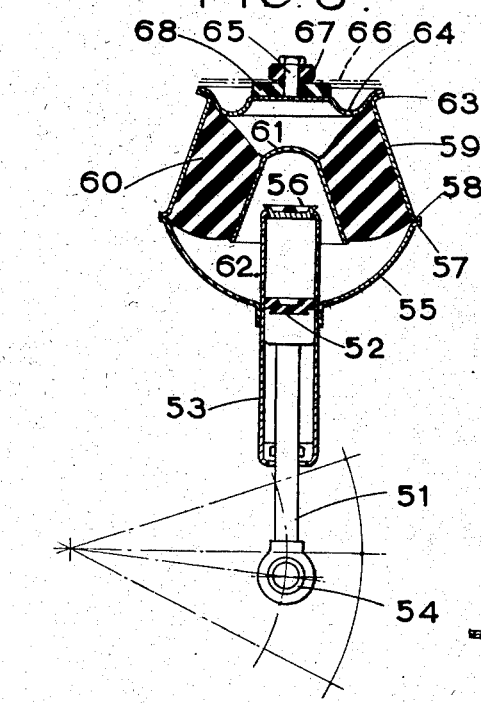
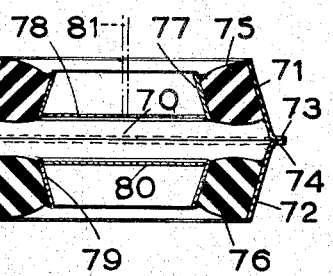
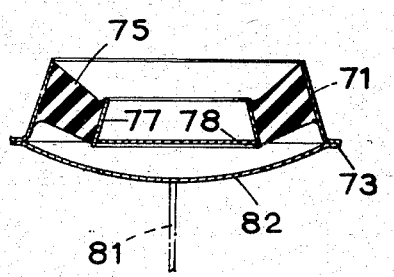
INVENTOR
Alexander Eric Moulton
BY Shoemaker & Mattare
ATTORNEYS United States Patent Office 2,883,180
Patented Apr. 21, 1959

2,883,180

HYDRAULIC ACCUMULATORS

Alexander Eric Moulton, Bradford-on-Avon, England

Application August 22, 1955, Serial No. 529,638

1 Claim. (Cl. 267—35)

This invention relates to hydraulic accumulators with more especial reference to rubber spring operated hydraulic accumulators and has for its object to provide a spring-loaded accumulator in which hydraulic pressure acting on a rubber spring causes deformation thereof and consequent storage of pressure.

Broadly stated, a rubber spring operated accumulator according to this invention includes a spring chamber for the fluid having an elastic rubber wall bonded to a rigid mounting in such manner that increases of the volume of the fluid in the chamber deform the rubber wall in shear and/or compression.

Normally the spring chamber will be connected to an hydraulic system, the arrangement being such that the hydraulic pressure within the system acts directly on the rubber wall of the chamber to deform it and accumulate pressure for subsequent use in the system.

Preferably, the rubber wall is a cylindrical body and is bonded at its outer face to a metal shell being housed with its associated metal shell in a cylindrical metal housing flanged at one end for the convenient fixing of an end closure member, the opposite end of the said metal housing being closed by a metal diaphragm, and, preferably also, the metal shell to which the rubber body is bonded is longitudinally split.

The rubber body in its free state is conveniently domed or convex at one end i.e. the end constituting the chamber wall and correspondingly cupped or concave at its opposite end.

In a specific embodiment of the invention described by way of example, a cylindrical rubber body and its associated longitudinally split metal shell is housed within a metal cylinder which as aforementioned is open and flanged at one end and is so dimensioned that the metal shell surrounding the rubber body fits snugly within the said metal housing, the domed or convex end surface of the rubber body protruding from the open end of the said housing. An end closure member is bolted to the flanged end of the cylindrical housing and when in position deforms the domed or convex end of the rubber body applying initial stress thereto and causing the concave end thereof also to be deformed.

A seal for the hydraulic medium of oil resisting material which also acts as a diaphragm is conveniently positioned between the end closure member and the rubber body such seal or diaphragm being fixed in position by the bolts which fasten the end closure member to the cylindrical housing.

The end closure member has a central hole or orifice which is connected to the hydraulic system, any appropriate valve or control mechanism being provided to govern the passage of hydraulic medium through the orifice.

In operation, when pressure in the hydraulic system is applied through the hole or orifice in the end closure member, the hydraulic medium acts directly upon the seal or diaphragm between the end closure member and the rubber body deflecting it and applying pressure to the rubber body within the metal housing causing it to deform and further to stress the rubber body, increasing hydraulic pressure causing the domed end of the rubber body to become cupped or concave and the opposite initially cupped or concave end will become domed or convex at the same time deforming the end metal diaphragm on the cylinder housing the rubber body when so stressed acting in the manner of a spring-loaded plunger.

It is conventional practice in motor vehicle suspension systems to utilise hydraulic dampers of the telescopic type i.e. those employing a piston sliding within a cylinder, and the present invention provides improved apparatus utilising such an hydraulic damper in combination with a rubber spring or rubber springs the combination being especially adapted to apparatus for use in vehicle suspension systems.

The improved apparatus comprises a telescopic hydraulic damper in combination with a rubber spring or springs wherein the rubber spring or springs acts or act directly on the hydraulic medium in such manner that simultaneously with deformation of the rubber there is displacement of the fluid which displacement may be controlled in any appropriate manner as by the usual damper valves to produce or generate hydraulic pressure within the system.

In the case of an automobile suspension system the lower end of the piston rod sliding in the hydraulic cylinder may be pivotally connected to the vehicle axle or wishbone assembly the rubber spring being mounted on the hydraulic cylinder and supporting the vehicle structure, the arrangement being such that hydraulic medium is confined and acted upon directly by the rubber spring.

The invention will be further described with reference to the accompanying drawings which illustrate by way of example several embodiments and in which:

Figures 1–3 show a primary embodiment, Figure 1 being a longitudinal sectional view of a solid cylindrical body of rubber bonded to a metal shell, Figure 2 being a similar view showing such rubber spring installed in a housing providing spring chamber, while Figure 3 is a view similar to Figure 1 but illustrating the maximum deformation of the solid rubber body under the influence of the hydraulic pressure.

Figures 4–7 illustrate an alternative arrangement in longitudinal section, Figure 4 showing the spring chamber assembly with two cylindrical rubber springs located symmetrically back to back on each side of a central spring chamber while Figure 5 is a similar view showing the maximum deformation of the springs under the influence of hydraulic pressure in such hydraulic chamber.

Figure 6 is a detail view of one of the rubber springs and metal shell units removed, while Figure 7 is also a detail view of one of the sealing diaphragms.

Figure 8 illustrates the improved rubber spring operated accumulator combined with a telescopic hydraulic damper suitable for use in a vehicle suspension system, the elastic rubber wall in this embodiment being of frusto-conical form, while Figures 9 and 10 show still further embodiments, that represented in Figure 9 having a central spring chamber with two symmetrically disposed elastic rubber walls of frusto-conical form.

Referring now to the drawings but first more particularly to Figures 1–3 a cylindrical body of rubber generally designated 1 and having a convex left hand end wall 2 and a complementary concave right hand end wall 3, is bonded to a cylindrical metal shell 4 which for convenience in manufacturing and assembling the spring is longitudinally split at 5.

6 is a cylindrical metal housing of a size to receive and fit around the cylindrical shell 4 to which the rubber spring 1 is bonded as a unit, the metal cylinder 6 being open at its left hand end and furnished with a flnage 7 to which an end closure member 8 can be bolted.

9 represents a seal or diaphragm of oil resisting material secured peripherally between the end closure 8 and the flange 7 and extending across the left hand end of the rubber body 1 thus forming one wall of a spring chamber 10 which is connected to an hydraulic system through a central port in the closure member 8 and a union 11.

At its other end the metal cylinder 6 is closed by a domed cap 12 which is shown vented to atmosphere at 13 and which limits the deformation of the rubber as the pressure and volume of the hydraulic fluid in the chamber 10 increases the arrangement being such, as will be appreciated, that when such increase takes place the rubber body 1 is elastically deformed in shear and compression up to the maximum deformation permitted by the domed cover 12 and represented in Figure 3.

Release or lowering of pressure in the chamber 10, permits the rubber body to recover elastically and reduce the volume of the chamber 10, to the extent permitted by the cover plate 8 which is shown shaped to apply initial compressive deformation to the rubber.

Referring now to the arrangement illustrated in Figures 4-7, as will be seen more clearly by reference to Figure 6, the rubber springs constituting part of the chamber walls again comprise cylindrical bodies of rubber, in this case designated 20 having one end 21 convex and the opposite end designated 22 concave, peripherally bonded within a cylindrical metal shell 24 which is shown longitudinally split at 25.

In this case, for convenience in moulding, the rubber spring 20 is formed with a blind hole or cavity 23 extending axially from the concave end to near the other end in the vicinity of the convex wall 21, and in this cavity is moulded a metal reinforcing tube 26 which may if desired be bonded to the rubber.

27 in Figures 4 and 5 are plugs at the inner ends of the blind holes 23, which remove any possibility of the rubber being extruded into the tubes 26 by the pressure in the chamber.

Two such cylindrical rubber units are mounted back to back in a metal housing 30 so that there is one common fluid chamber 31 between them which communicates with an hydraulic system through a central port 32 in the wall of the housing 30 and a pipe union 33.

In this embodiment each rubber spring unit or cartridge is shown separated from the common central fluid chamber 31 by a relatively thick diaphragm 35 of a synthetic rubber or rubber-like material resistant to the hydraulic medium in use.

As will be seen more clearly from Figure 7 such diaphragm is bonded in a ring 36, which may be continuous, and which closely fits the bore of the cylindrical housing 30 while further to ensure a fluid tight seal therewith the rings 36 are shown formed with peripheral grooves 37.

As in the embodiment previously described the housing 30 is furnished with end caps which are designated 38 and 39 and have central vents 40 to atmosphere, and these caps conveniently serve to limit the maximum deformation of the rubber springs 20 under the pressure of the hydraulic medium in the fluid chamber 21.

The end caps are conveniently secured by circlips, the construction as will be seen from Figures 4 and 5 lending itself to convenient assemblies and compactness and being suitable for high pressures of the order of 1000-1500 p.s.i.

Referring now to the combined telescopic hydraulic damper or dashpot and rubber spring operated hydraulic accumulator illustrated in Figure 8, 51 designates a piston rod depending from a piston 52 in a dashpot cylinder 53, the lower end 54 of the rod 51 being suitable for pivotal connection, say to a vehicle axle or wishbone assembly where the device is for use in a vehicle suspension.

Welded or otherwise secured to the hydraulic cylinder or dashpot 53 is a part spherical metal dish 55 forming the bottom of the fluid chamber and in open communication with the interior of the dashpot above the piston 52 although if desired a cap such as 56 at the head of the dashpot may contain a restricted orifice or damper-type valve.

The part spherical dish 55 has a peripheral flange 57 upon which seats a corresponding flange 58 on a frusto-conical metal shell 59 to the inner face of which is bonded a body of rubber 60 also of hollow frusto-conical form.

Within the hollow rubber body 60 is bonded an inner metal shell 61 in the form of an inverted cup which forms the upper closure member of a fluid chamber designated by the reference 62.

The hollow frusto-conical outer shell 59 is shown provided with an upper peripheral flange 63 on which seats a dished cover plate 64 having a central stud 65 by which the apparatus may be conveniently incorporated in a vehicle suspension say by being secured, suitably with interposed rubber washers such as 67 and 68, to some appropriate part of the sprung structure shown dotted at 66, above the axle or wishbone.

In operation on upward deflection of the piston rod 51 in relation to the dashpot 53, say when cushioning a road shock, fluid is transferred by the piston 52 from the interior of the dashpot 53 above such piston into the chamber 62 and such increase in volume of the fluid in the chamber is resiliently resisted by the frusto conical rubber spring 60 which constitutes a portion of the wall of such chamber.

It will be understood that the rubber spring 60 is not interposed directly in the suspension system except in so far as it is deformed in shear and/or compression by the fluid in the chamber 62 and that after such deformation it tends elastically to restore equilibrium conditions by returning excess fluid from the chamber 62 to the dashpot 53 and thereby lower the piston rod 51 and piston 52 in relation to such dashpot cylinder.

Referring now to the arrangement shown in Figure 9, it will be noted that a central chamber 70 is formed between two hollow frusto conical rings 71 and 72 which have mating flanges 73 and 74 suitable for bolting or clamping together.

Moulded within each ring is a hollow frusto conical body of rubber, 75 for the ring 71 and 76 for the ring 72, and concentrically within each rubber body is a frusto conical form of sheet metal, the rubber body 75 being bonded on its inner conical face to an upstanding flange 77 on a form 78, and the lower body 76 being similarly bonded to a depending flange 79 on a form 80.

81 is a central pipe connection for the hydraulic fluid, increase in the volume of fluid in the chamber 70 causing mutual recession of the forms 78 and 80 one from the other, and consequent deformation of the rubber springs 76, 76 which tend to restore the forms to their pristine position by forcing the hydraulic medium out of the chamber 70 through the pipe 81.

Finally in Figure 10 the lower frusto conical ring unit 76 is replaced by a domed base wall 82 forming the bottom of the chamber and into which leads the pipe line 81.

In this specification the term rubber is intended to include synthetic rubber and rubber like materials and the term "hydraulic" is intended to embrace oil and any other appropriate liquid medium. Moreover the elastic rubber wall may comprise only some part of the chamber as in Figures 2, 8 and 9, or substantially the whole wall of the chamber as in Figures 4 and 5, and although a metal shell such as 4 or 24 is preferred for its rigid mounting, other materials such as vulcanite may be utilized.

By the present invention improved and efficient arrangements of hydraulic accumulator are obtained.

What I claim is:

A hydraulically-operated energy-storing device comprising a rigid tubular mounting shell of cylindrical form, an elongate substantially solid elastic rubber body of circular form within and filling the shell, said body being peripherally bonded throughout its length to the shell, the body having one end convex and the other end concave, means encasing the shell and the body forming a fluid receiving chamber over the convex end and forming an expansion chamber over the concave end of the body, said expansion chamber being ported to the atmosphere, and means for introducing a fluid under pressure into said fluid receiving chamber to deform the body in shear toward and into said expansion chamber.

References Cited in the file of this patent

UNITED STATES PATENTS

| 2,313,486 | Gratzmuller et al. | Mar. 9, 1943 |
| 2,318,437 | Vickers | May 4, 1943 |
| 2,504,424 | Kraak | Apr. 18, 1950 |
| 2,537,634 | Brown | Jan. 9, 1951 |
| 2,582,363 | Thiry | Jan. 15, 1952 |
| 2,808,070 | Malsbary | Oct. 1, 1957 |

FOREIGN PATENTS

| 28,709 | Great Britain | of 1910 |
| 714,386 | Germany | Nov. 28, 1941 |
| 698,953 | Great Britain | Oct. 28, 1953 |
| 1,089,663 | France | Oct. 6, 1954 |